(12) United States Patent
Maier et al.

(10) Patent No.: US 6,799,799 B2
(45) Date of Patent: Oct. 5, 2004

(54) CHILD SAFETY SEAT

(75) Inventors: Dieter Maier, Giengen (DE); Hermann Schall, Neenstetten (DE)

(73) Assignee: Britax Romer Kindersicherheit GmbH, Ulm (DE)

( * ) Notice: Subject to any disclaimer, the term of this patent is extended or adjusted under 35 U.S.C. 154(b) by 0 days.

(21) Appl. No.: 10/010,277

(22) Filed: Nov. 5, 2001

(65) Prior Publication Data

US 2002/0038968 A1 Apr. 4, 2002

Related U.S. Application Data

(63) Continuation-in-part of application No. 09/678,004, filed on Oct. 3, 2000, now Pat. No. 6,325,454.

(30) Foreign Application Priority Data

Oct. 9, 1999 (GB) .............................................. 9923868

(51) Int. Cl.[7] ................................................ A47D 1/10
(52) U.S. Cl. ...................................................... 297/253
(58) Field of Search .............................. 297/253, 250.1, 297/256.1, 256.13, 216.4, 216.1

(56) References Cited

U.S. PATENT DOCUMENTS

| | | |
|---|---|---|
| 3,262,736 A | 7/1966 | Merelis |
| 4,913,490 A | 4/1990 | Takahashi et al. .......... 297/250 |
| 5,487,588 A | 1/1996 | Burleigh et al. |
| 5,816,651 A | 10/1998 | Feuerherdt |
| 5,884,967 A * | 3/1999 | Gasper |
| 6,017,087 A | 1/2000 | Anthony et al. ......... 297/250.1 |
| 6,082,819 A | 7/2000 | Jackson |
| 6,193,310 B1 | 2/2001 | Batalaris et al. ............ 297/253 |
| 6,375,260 B1 * | 4/2002 | Hiramatsu et al. |

FOREIGN PATENT DOCUMENTS

| | | | |
|---|---|---|---|
| DE | 295 06 847 U1 | 8/1995 | ............ B60N/2/26 |
| DE | 197 08 044 C1 | 6/1998 | ............ B60N/2/28 |
| DE | 197 23 345 C1 | 7/1998 | ............ B60N/2/28 |
| EP | 0 403 853 A2 | 12/1990 | ............ B60N/2/28 |
| EP | 0 952 032 A2 | 10/1999 | ............ B60N/2/28 |
| EP | 1 059 194 A1 | 6/2000 | ............ B60N/2/28 |
| EP | 1 090 804 A2 | 10/2000 | ............ B60N/2/28 |

* cited by examiner

*Primary Examiner*—Milton Nelson, Jr.
(74) *Attorney, Agent, or Firm*—Davis & Bujold, P.L.L.C.

(57) ABSTRACT

A child safety seat comprises a seat structure having a base support surface for resting on a vehicle seat cushion, and a seating surface for a child occupant, the seating surface. A rigid link is attached to the child seat structure solely by a coupling mechanism that permits angular movement of the child seat structure relative to the rigid links about an axis located above the base support surface. A releasable connector is mounted on the rigid link for engagement with a standard anchorage unit associated with the vehicle seat. The child safety seat may be either forward facing or rearward facing.

12 Claims, 10 Drawing Sheets

CHILD SAFETY SEAT

This application is a continuation-in-part of U.S. patent application Ser. No. 09/678,004 filed Oct. 3, 2000 now U.S. Pat. No. 6,325,454.

FIELD

This invention relates to a child safety seat for use in a vehicle.

RELATED ART

It is well known for a child safety seat to rest on a vehicle seat and to be secured thereon by the corresponding vehicle seat belt. The disadvantage of this arrangement is that, even if the vehicle seat belt is pulled very tight during installation, the resilience of the belt, will permit undesirable movement of the child seat relative to the vehicle in the event of sudden deceleration, for example, during an accident. In order to overcome this disadvantage, it has been proposed to provide vehicle seats with standard anchorage units at agreed locations for engagement by releasable connectors which are attached to the child seat structure by rigid links. Such anchorage units will be referred to hereinafter as "standard anchorage units".

The invention relates to a child safety seat of the type comprising a child seat structure having a base support surface for resting on a vehicle seat cushion, a back support surface for abutting against the seat back of said vehicle seat, a rigid link projecting from the child seat structure between the base support surface and the back support surface, and a releasable connector mounted on the rigid link for engagement with a standard anchorage unit associated with the vehicle seat.

U.S. Pat. No. 6,082,819 discloses such a child safety seat for use with two standard anchorage units located near the rear edge of the vehicle seat cushion and the bottom of the vehicle seat back. This arrangement is subject to the disadvantage that, in the event of an accident, the child seat tends to rotate about the standard anchorage units, compressing the front part of the vehicle seat cushion and allowing undesirable forward movement of the head of a child occupant of the child seat. The present invention aims to provide a child safety seat in which this disadvantage is mitigated.

SUMMARY OF THE INVENTION

According to the invention, in a child safety seat of the type described above, the rigid link is pivotally attached to the child seat structure.

Preferably the rigid link is pivotally attached to the child seat structure at a pivot location above the base support surface.

In the event of sudden deceleration, operation of this arrangement differs from the prior art in that the centre of gravity of the combination of the child seat structure and the seat occupant does not rotate about the standard anchorage units at a constant radius. Instead both the front and rear edges of the base support surface are pressed downwards into the vehicle seat cushion simultaneously. This results in a reduction in the distance of this centre of gravity from the anchorage units and therefore a corresponding reduction in the rotational moment exerted by the inertia of the child seat. The overall result is a reduction of the extend of forward excursion of the child's head.

Preferably, each rigid link is L-shaped with a first limb carrying the corresponding connector and a second limb having its free end pivotally attached to the child seat structure. In normal use, the first limb lies in a rearward continuation of the plane of the base support surface and the second limb is generally parallel to the back support surface.

The height of the pivot location above the base surface is at least 30 mm so as to be greater than the reduction of the thickness of the vehicle seat cushion when it is fully compressed.

DETAILED DESCRIPTION OF THE PREFERRED EMBODIMENT

Figure 1:
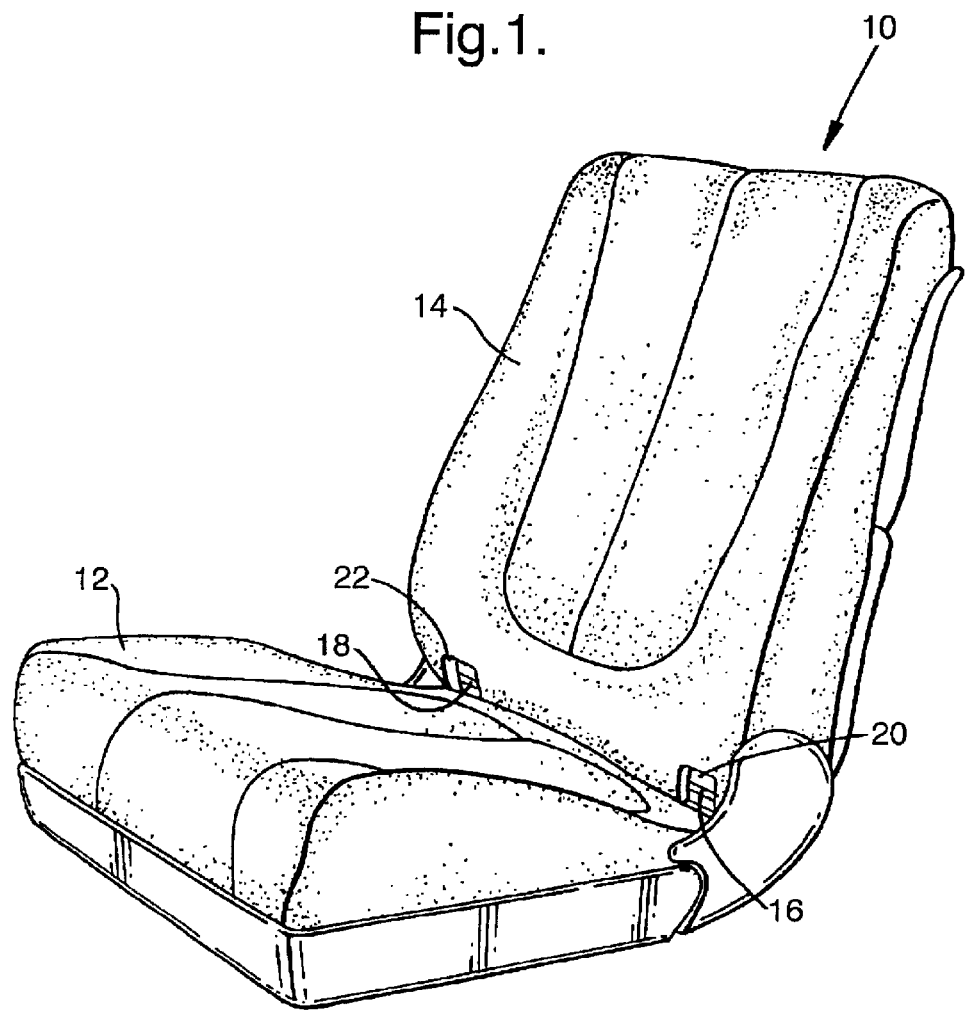
FIG. 1 is a perspective view of a vehicle seat equipped with standard anchorage units.

FIG. 1 shows a vehicle seat 10 equipped with two standard anchorage units according to the first proposal. The seat 10 comprises a seat cushion 12 and a backrest 14. The two standard anchorage units comprise transversely extending rods 16 and 18 which are accessible through openings 20 and 22 in the bottom of the backrest and which are rigidly secured to the frame (not shown) of the seat 10.

Figure 2:
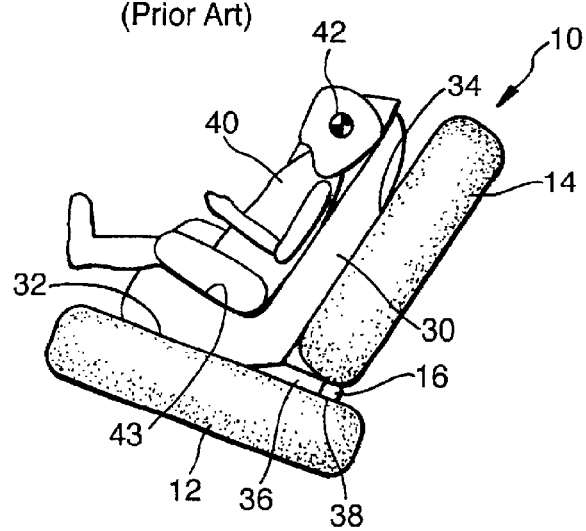
FIG. 2 is a schematic side view of a known forward-facing child seat installed on the vehicle seat shown in FIG. 1 with a test dummy on the child seat.

FIG. 2 shows a known child seat 30 having a base support surface 32 resting on the seat cushion 12 of the vehicle seat 10 and a back support surface 34 abutting against the backrest 14. A rigid link 36 projects from the junction between the base support surface 32 and the back support surface 34 and is rigidly secured to the child seat 30 so as to be fixed parallel with the base support surface 32. A releasable connector 38 engages with the standard anchorage unit 16. A similar releasable connector (not shown), on another rigid link, engages with the other standard anchorage unit 18. The releasable connectors may be as described in U.S. Pat. No. 6,082,819.

The seat is occupied by a test dummy 40 having a reference marking 42 on the side of its head. The dummy 40 is retained on a seating surface 43 of the child seat 30 by a conventional harness (not shown).

Figure 3:
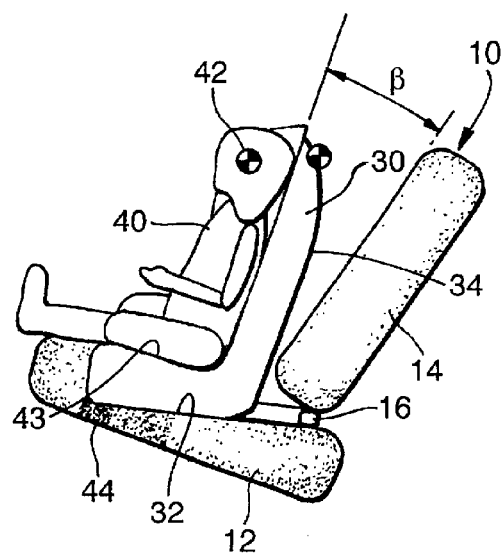
FIG. 3 is a side view similar to FIG. 2 showing the child seat and dummy in an initial phase of movement after sudden deceleration of the vehicle.
Figure 4:
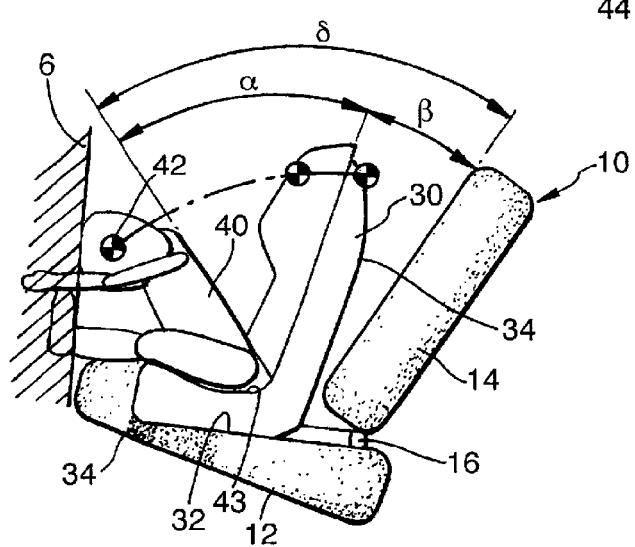
FIG. 4 is a schematic side view, similar to FIGS. 2 and 3 after a second phase of deceleration.

If the vehicle seat 10 is subject to sudden deceleration in the normal direction of travel, the child seat 30 tends to pivot in the counter-clockwise direction (as viewed in FIGS. 2 to 4) about the standard anchorage units 16 and 18. This results in compression of the part 44 of the vehicle seat cushion 12 which is under the front edge of the base surface 32 and pivotal movement of the child seat 30 through an angle β as shown in FIG. 3. During the next phase of movement, the torso of the dummy 40 pivots about its pelvis through an angle α as shown in FIG. 4, resulting in a total forward movement through an angle δ (equal to α+β). This movement allows the head of the dummy to come into contact with a reference surface 46 positioned in front of the vehicle seat 10, thus exceeding the extent of undesirable forward movement.

Figure 5:
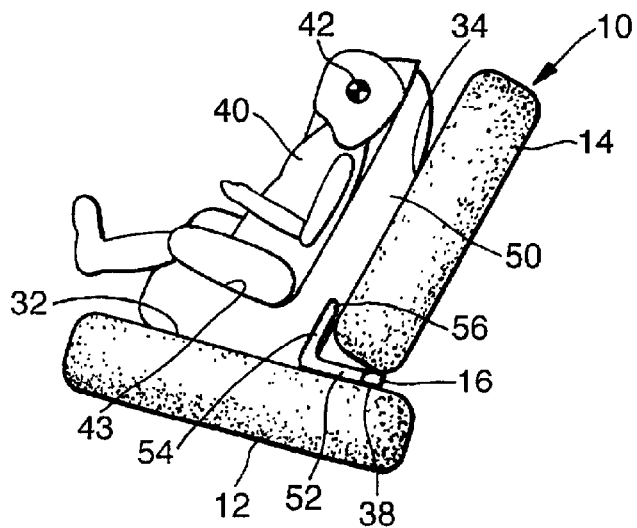
FIGS. 5, 6 and 7 are side views, similar to FIGS. 2, 3 and 4 respectively showing a forward-facing child seat in accordance with the invention on the vehicle seat shown in FIG. 1.

FIG. 5 shows a child seat 50 in accordance with the invention, having support surfaces 32 and 34 similar to the correspondingly numbered support surfaces of the child seat 40. However, the releasable connector 38, which engages with the standard anchorage unit 16 is mounted on the end of one limb 52 of an L-shaped link, the other limb 54 of which has its free end attached by a pivot connection 56 to the child seat 50 at a location adjacent to the back support surface 34 above the base support surface 32 at a distance equal to the length of the limb 54. A similar link (not shown) is provided for the connector which engages with the other standard anchorage unit 18.

Figure 6:
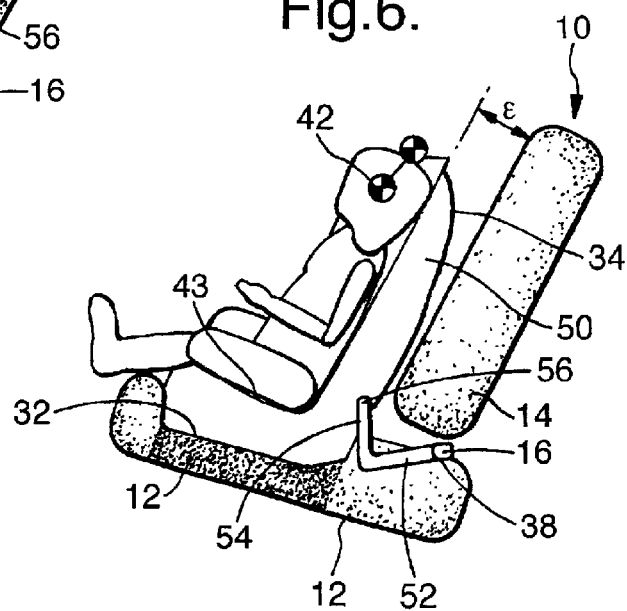

Under normal conditions, the link 52, 54 is retained in the orientation shown in FIG. 5 by a latch (not shown), such as ball catch which is designed to release when a load is applied. During the first phase of forward movement in the event of sudden deceleration, the link 52, 54 pivots in the counter-clockwise direction about the standard anchorage unit 16. The pivot joint 56 allows the base support surface 32 of the seat 50 to remain generally parallel to the vehicle seat cushion 12, compressing it substantially uniformly, as shown in FIG. 6. Consequently, the effective range of angular movement of the child seat 50 about the standard anchorage unit 16 is limited to ε, which is substantially less than β. The compression of such a large area of the vehicle seat cushion 12 provides a greater resistance against downward movement of the child seat 50, with the result that the front edge of the base support surface 32 is higher in FIG. 6 than in FIG. 3.

Figure 7:
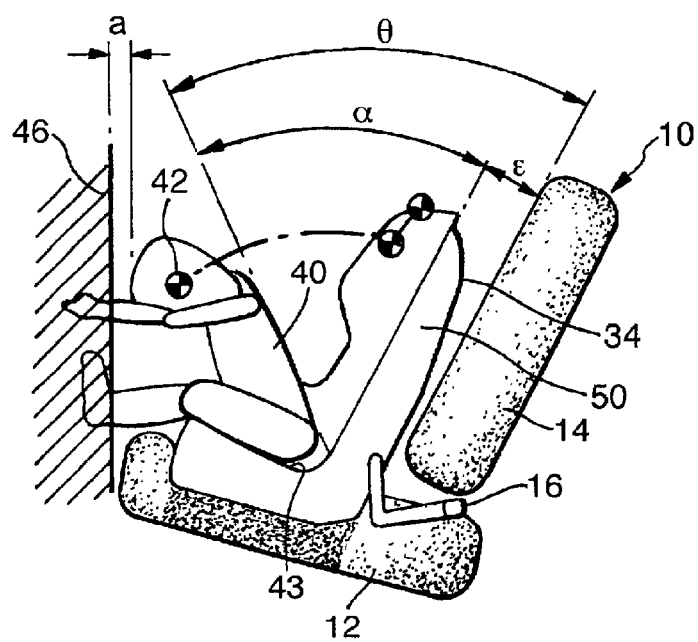

During the subsequent phase of movement, the torso of the dummy 40 pivots about its pelvis through the angle α, as before. The total angular movement θ of the dummy 40 is less than the angle δ, as shown in FIG. 7. Consequently, the total forward movement of the head of the dummy 40 is less, leaving a clearance a from the reference surface 46, as shown in FIG. 7.

Figure 8:
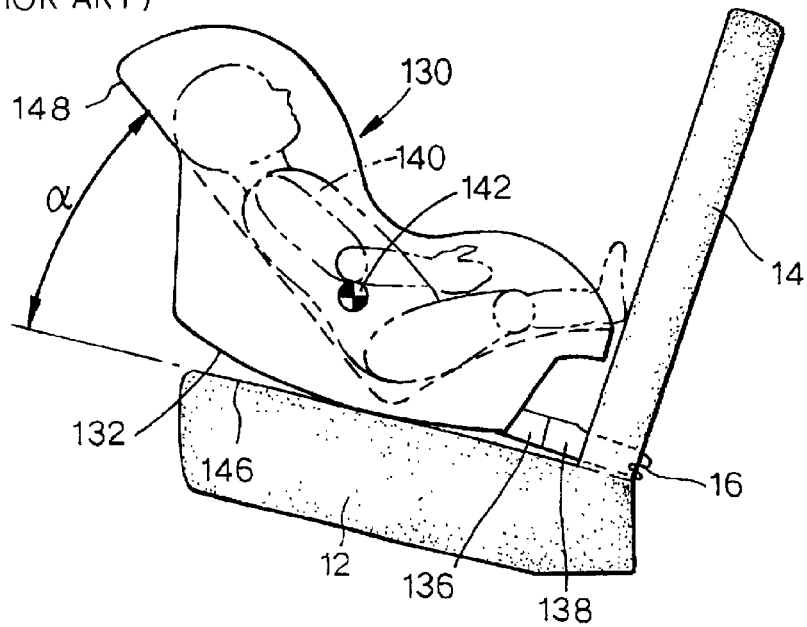
FIG. 8 is a schematic side view of a known rearward facing child seat installed on the vehicle seat shown in FIG. 1 with a test dummy on the child seat.

FIG. 8 shows a known rearward facing child seat 130 having a base support surface 132 resting on the seat cushion 12 of the vehicle seat 10. A rigid link 136 projects rearwardly just above the base support surface 132 and is rigidly secured to the child seat 130 so as to be fixed parallel with the base support surface 132. A releasable connector 138 engages with the standard anchorage unit 16. A similar releasable connector (not shown), on another rigid link, engages with the other standard anchorage unit 18. The seat is occupied by a test dummy 140 having a reference mark 142 on the side of its body near its centre of gravity. The dummy 140 is retained in the child seat 130 by a conventional harness (not shown).

Figure 9:
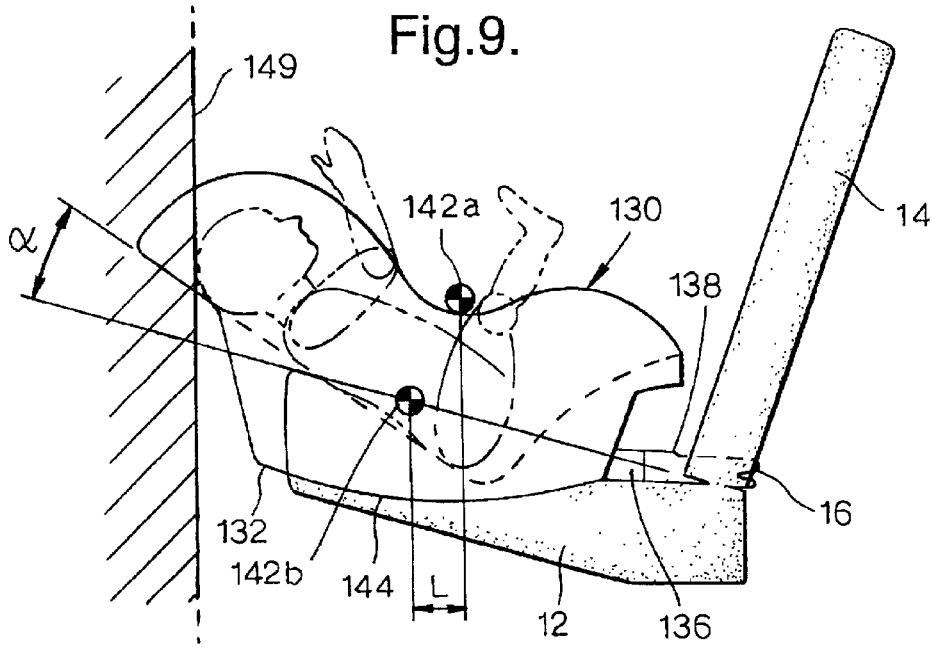
FIG. 9 is a side view similar to FIG. 2 showing the child seat and dummy after an initial phase of sudden deceleration of the vehicle.

If the vehicle seat 10 is subject to sudden deceleration in the normal direction of travel, the child seat 130 tends to pivot in the counter-clockwise direction (as viewed in FIGS. 8 and 9) about the standard anchorage units 16 and 18. This results in compression of the part 144 of the vehicle seat cushion 12 which is under the front edge of the base surface 132 and pivotal movement of the child seat 130 as shown in FIG. 9, causing a decrease of the angle a between the normal position of the top surface 146 of the vehicle seat cushion 12 and the backrest 148 of the child seat 130. The reference mark 142 moves forwards through a distance L from its original position (shown at 142a in FIG. 9) to an new position 142b. This movement allows the head of the dummy to come into contact with a reference surface 149 positioned in front of the vehicle seat 10, thus exceeding the extent of acceptable forward movement.

Figure 10:
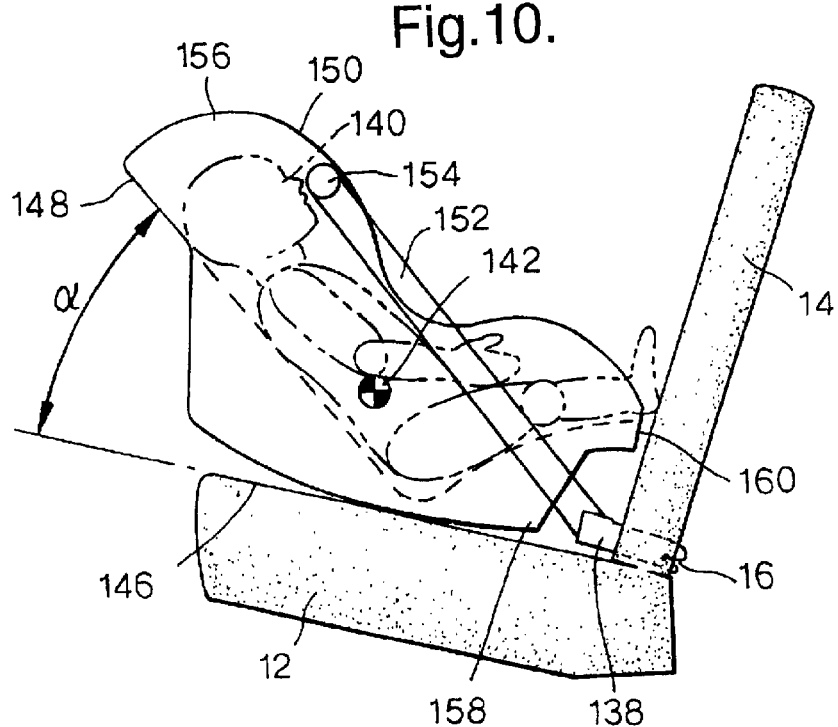
FIGS. 10 and 11 are schematic side views, similar to FIGS. 8 and 9 of a first rearward-facing embodiment of the invention.

FIG. 10 show a child seat 150 in accordance with the invention. The links 132 are replaced by longer links 152 which are attached by pivot joints 154 to side wings 156 of the child seat 150 in the vicinity of the head of the dummy 140, i.e. well above the centre of gravity of the child seat 150 and the dummy 140. Releasable connectors 138 are mounted on the other ends of the links 152 and engage with respective anchorage units 16 and 18.

During sudden deceleration, the child seat 150 pivots in a clockwise direction about the pivot joints 154 resulting in an increase in the angle á. Consequently, although the reference mark 142 still moves forwards through approximately the same distance L, a substantial clearance a remains between the head of the dummy 140 and the reference surface 149.

Figure 12:
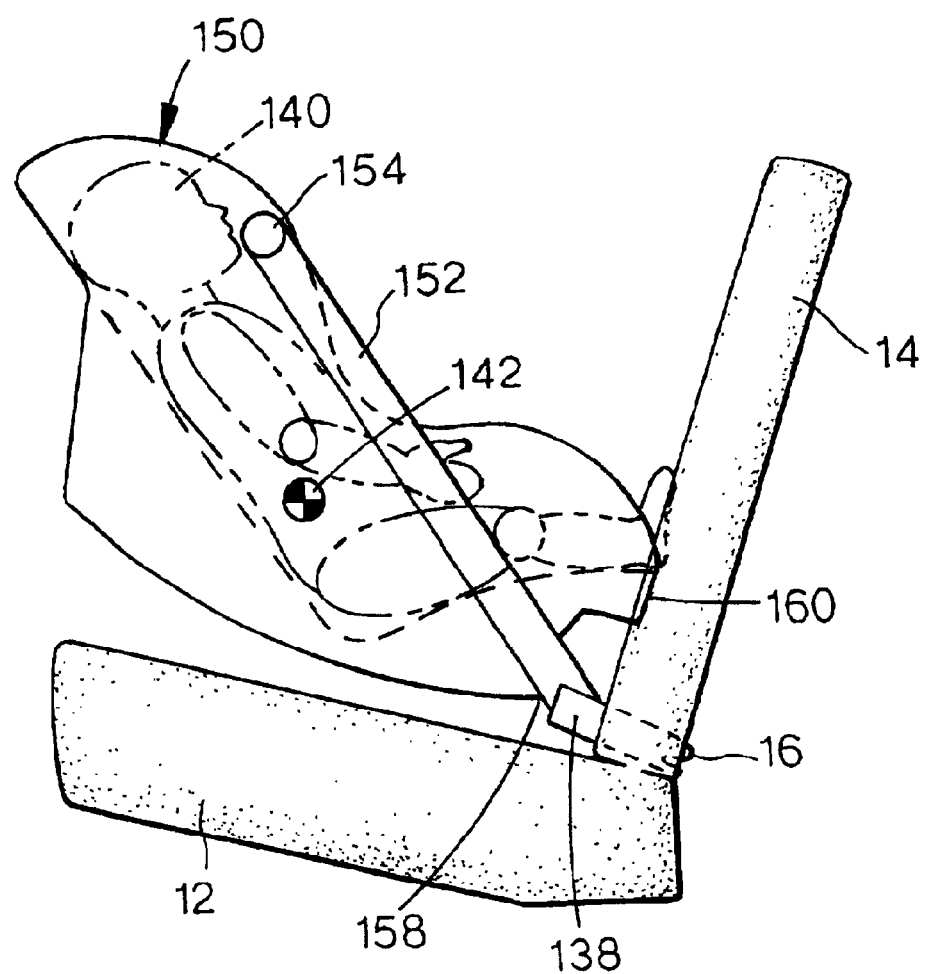
FIG. 12 is a schematic side view of the embodiment shown in FIGS. 10 and 11, after a second phase of deceleration.

After its initial phase of movement, the child seat 150 is subject to rebound. Counter-clockwise angular movement of the child seat 130 is limited by a stop 158 which comes into abutment with the adjacent link 152, as shown in FIG. 12. The result is that the foot end 160 of the child seat 130 abuts against the vehicle seat back 14 to limit clockwise angular movement about the anchorage units 16 and 18.

Figure 13:
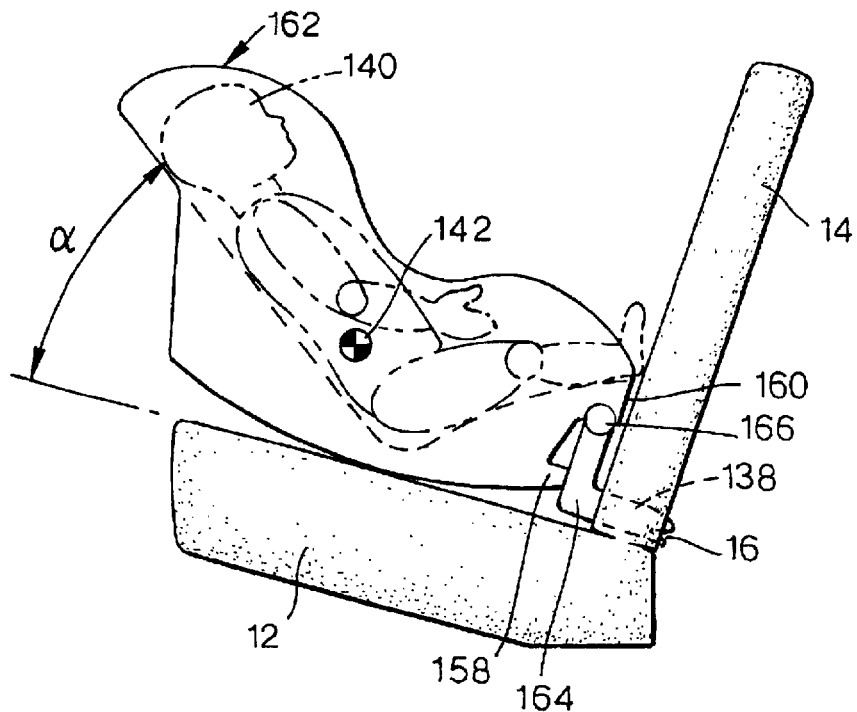
FIGS. 13 and 14 are schematic side views, similar to FIGS. 10 and 11 of a second rearward-facing embodiment of the invention.
Figure 14:
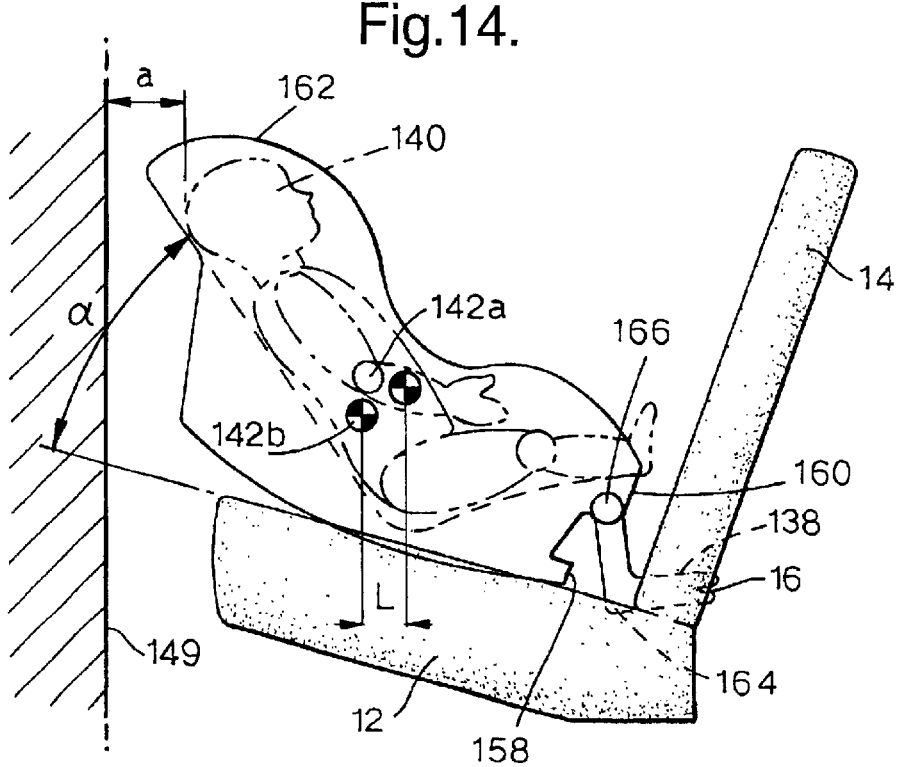

FIGS. 13 and 14 show a child seat 162 in which the relatively long links 152 are replaced by more compact L-shaped links 164 attached by pivot joints 166 to the foot end 160 of the child seat 162, above the stop 158. In the event of sudden deceleration, there is no significant change in the angle á. Consequently, although the child seat 162 is more compact, the performance is not as good as that of the child seat 150 of FIGS. 10 to 12. Nevertheless, there is an acceptable clearance a between the head of the dummy 140 and the reference surface 149.

Figure 15:
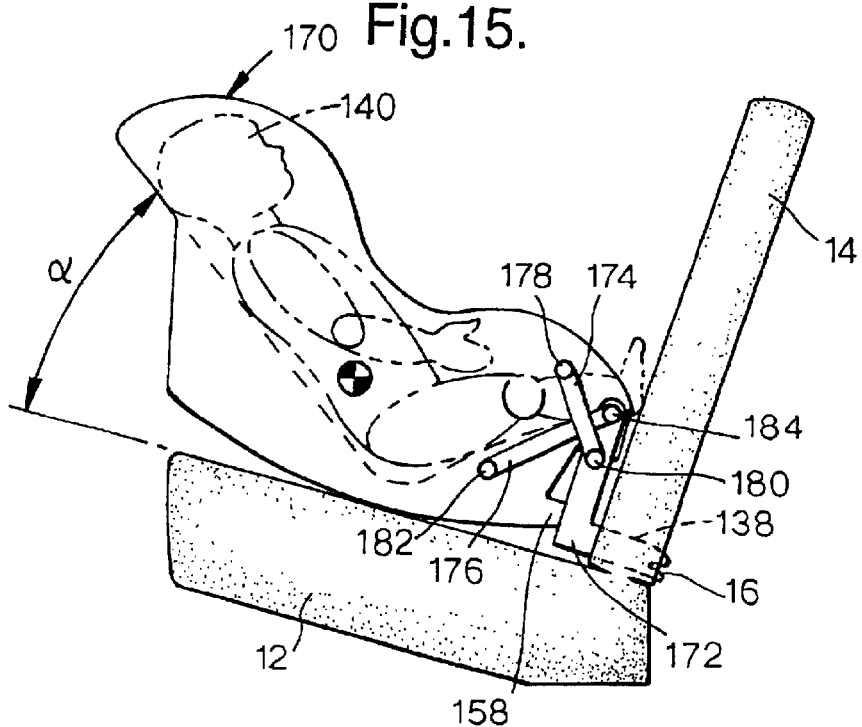
FIGS. 15 and 16 are schematic side views, similar to FIGS. 10 and 11 of a third rearward-facing embodiment of the invention.
Figure 16:
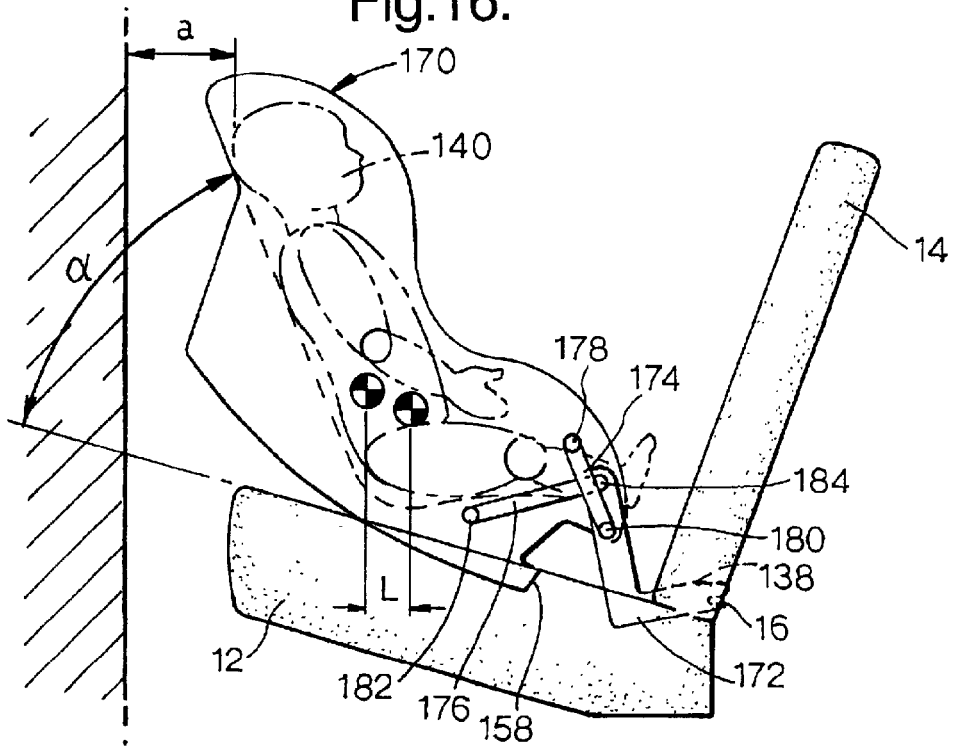

In FIGS. 15 and 16, a child seat 170 has L-shaped links 172 attached to its releasable connectors 138. However, each link 172 is connected to the child seat 170 by a first and second auxiliary links 174 and 176. The first auxiliary link 174 has one end attached to the child seat 170 by a first pivot joint 178 and another end attached to the L-shaped link 172 by a second pivot joint 180. The second auxiliary link 176 is longer than the link 174 and has one end attached to the child seat 170 by a third pivot joint 182 located below the first pivot joint and another end attached to the rigid link by a fourth pivot joint 184 located above the second pivot joint. The effect of this is that, in the event of sudden deceleration, the child seat turns in a clockwise direction so as to increase the angle á. This results in an increased clearance a between the head of the dummy 140 and the reference surface 149.

Figure 17:
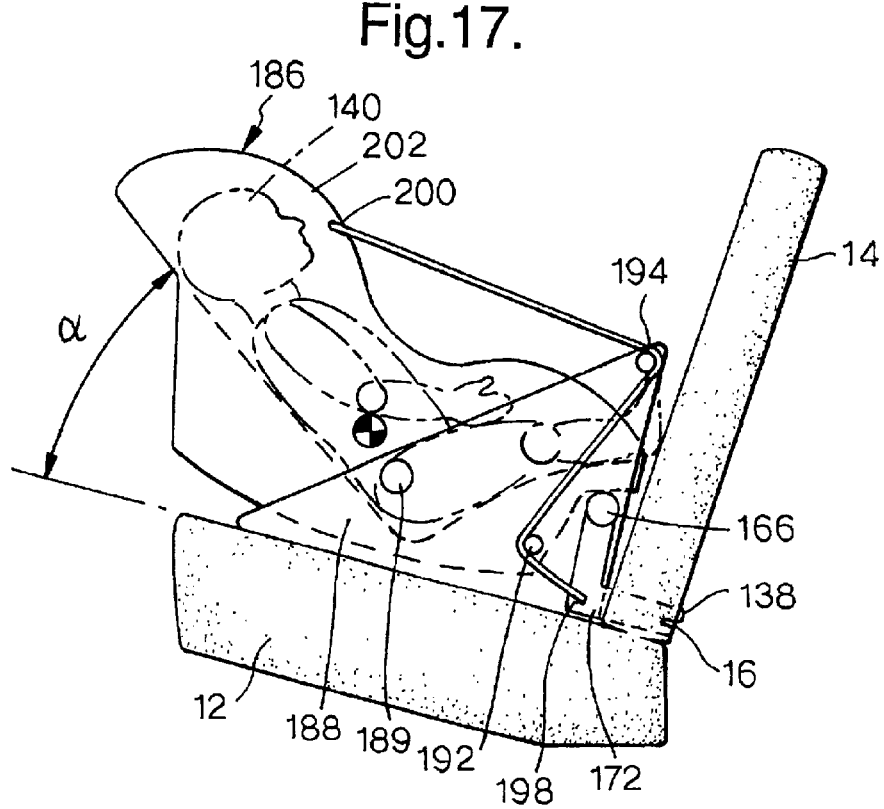
FIGS. 17 and 18 are schematic side views, similar to FIGS. 10 and 11 of a fourth rearward-facing embodiment of the invention.
Figure 18:
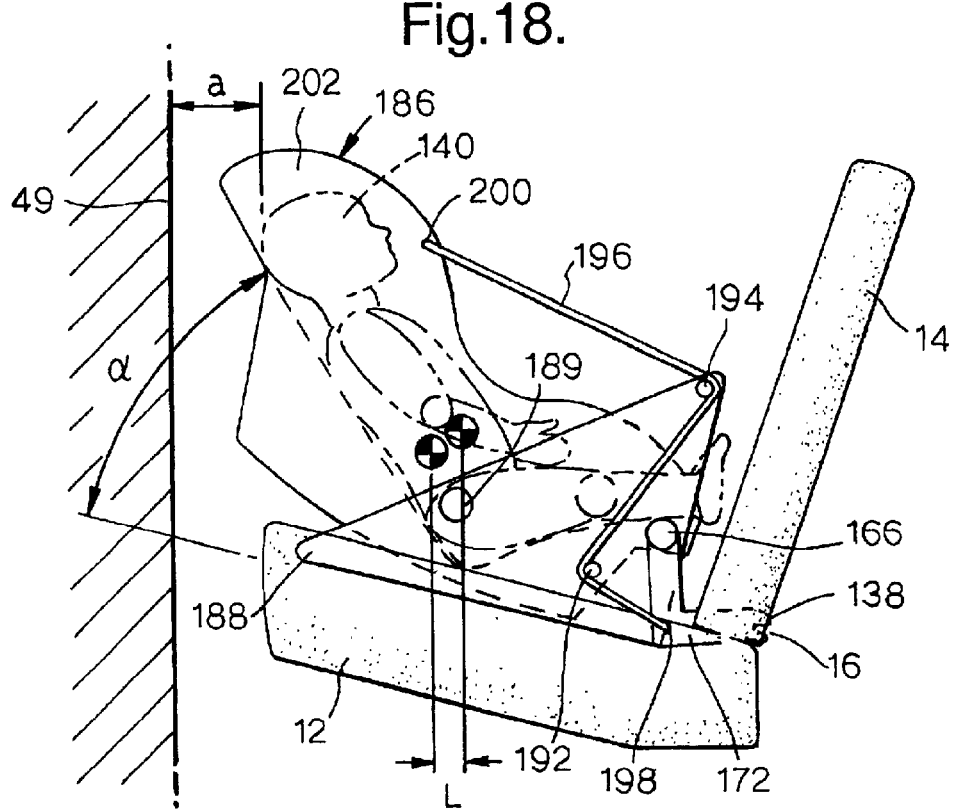

FIGS. 17 and 18 show a child seat 186 having L-shaped links 172 attached to its releasable connectors 138, as in FIGS. 13 and 14. In addition, a base rests on the seat cushion 12 and has side panels 188 pivotally attached to each side of the child seat 186 by respective pivot pins 189. Each side panel carries a first pulley 192 below, and a second pulley 194 above, the pivot joint 166 attaching the corresponding L-shaped link 172 to the child seat 186. A flexible cable 196 extends from a point 198 on the L-shaped link 172 at the junction between its two limbs, round the first pulley 192, then round the second pulley 194, to a point 200 on the corresponding side wing 202 of the seat 186. In the event of an accident, the downward movement of the L-shaped link 172 causes the cable 196 to pull the upper part of the child seat 186 rearwardly, thus increasing the clearance a between the head of the dummy 140 and the reference surface 149.

Figure 11:
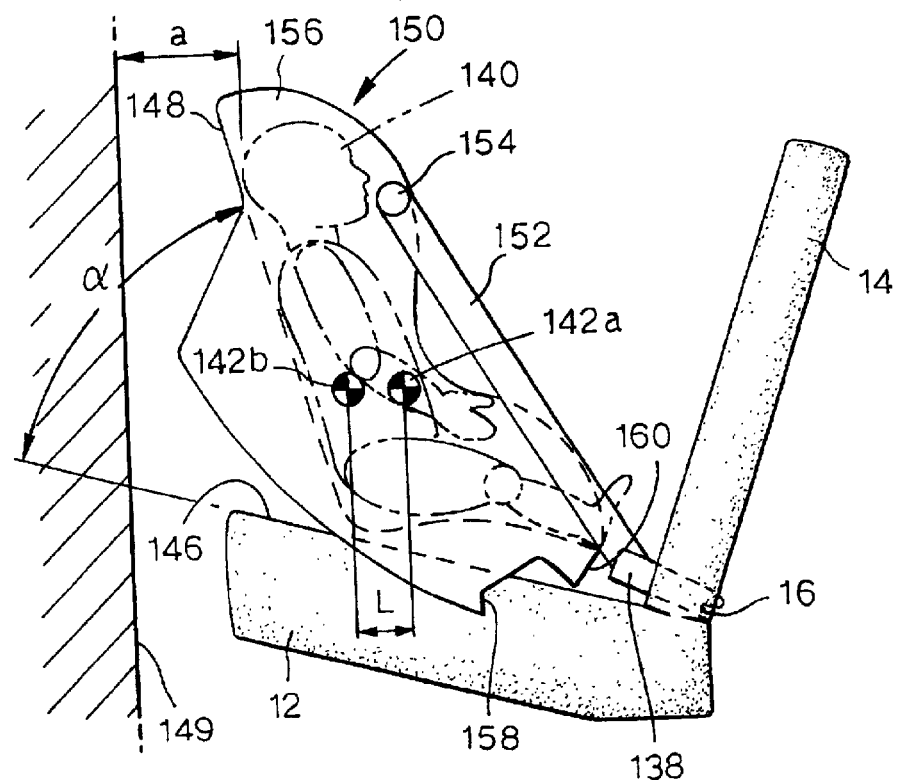
Figure 19:
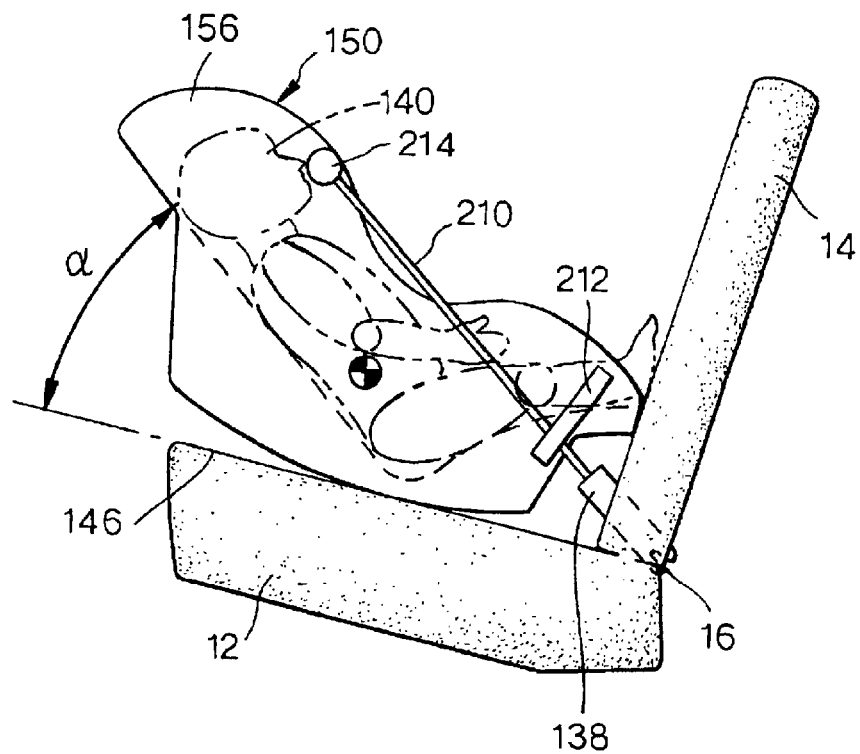
FIGS. 19 and 20 are schematic side views, similar to FIGS. 10 and 11 of a fifth rearward-facing embodiment of the invention.
Figure 20:
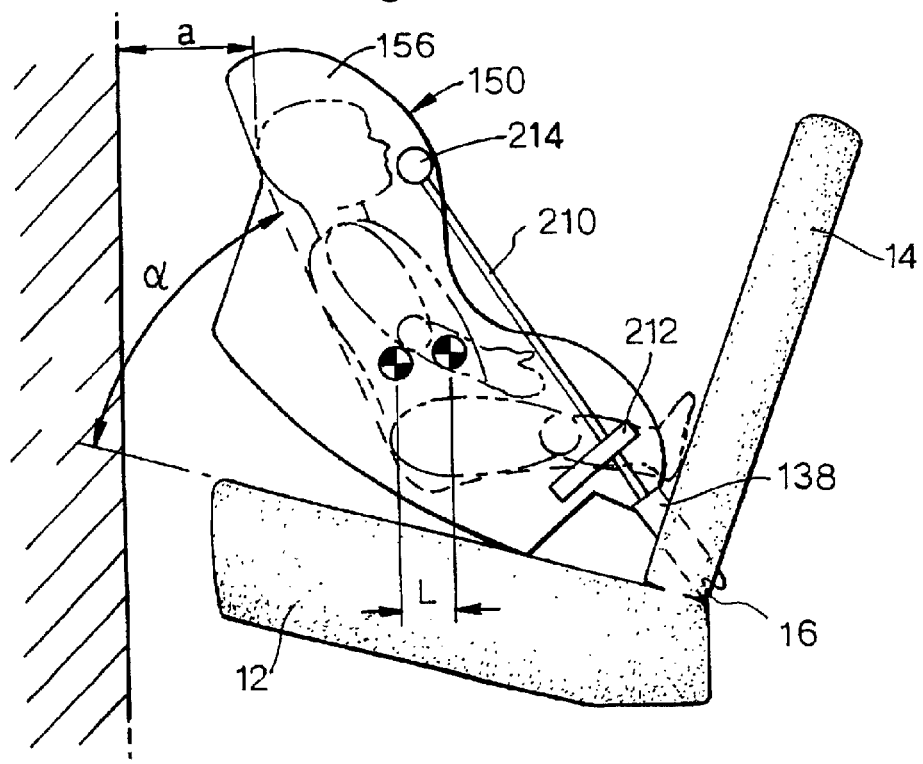

FIGS. 19 and 20 show a modified version of the child seat 150 illustrated in FIGS. 10 and 11, corresponding parts being denoted by the same reference numerals. The long links 152 are replaced by cables 210 which extend from the releasable connectors 138, through respective slots formed in guide members 212 mounted on the lower parts of the side wings 156, to attachment points 214 on the upper parts of the side wings 156. Operation is as described above with reference to FIGS. 10 and 11, the guide members 212 serving to limit the range of clockwise movement of the seat 150 during rebound.

The invention is applicable to seats for use in aircraft as well as to seats for use in land vehicles.

What is claimed is:

1. A child safety seat for use on a vehicle seat having a seat cushion and a seat back, the child safety seat comprising:
   a child seat structure having a base support surface for resting on said seat cushion, and a seating surface for a child occupant,
   a rigid link attached to the child seat structure solely by a coupling mechanism that permits angular movement of the child seat structure relative to the rigid link about an axis located above the base support surface, and wherein the rigid link is connected to the child seat structure by both a first auxiliary link which has one end attached to the child seat structure by a first pivot joint and another end attached to the rigid link by a second pivot joint and a second auxiliary link which has one end attached to the child seat structure by a third pivot joint located above the first pivot joint and another end attached to the rigid link by a fourth pivot joint located below the second pivot joint, and
   a releasable connector mounted on the rigid link for engagement with a standard anchorage unit associated with the vehicle seat.

2. A child safety seat according to claim 1, wherein the rigid link is L-shaped with a first limb carrying the releasable connector and a second limb having a free end pivotally attached to the child seat structure.

3. A rearward facing child safety seat for use on a vehicle seat having a seat cushion and a seat back, the child safety seat comprising:
   a child seat structure having a base support surface for resting on said seat cushion, and a seating surface for a child occupant, said seating surface including a seat portion and a backrest portion,
   a rigid link projecting from an end of the child seat structure opposite to the backrest portion and attached to the child seat structure solely by a coupling mechanism that permits angular movement of the child seat structure, when in use, relative to the rigid link about a link axis located above the base support surface, and
   a releasable connector mounted on the rigid link for engagement with a standard anchorage unit associated with the vehicle seat.

4. A child safety seat according to claim 3, wherein the rigid link is connected to the seat portion of the child seat structure at a location above the support surface and remote from the backrest portion thereof.

5. A child safety seat according to claim 3, wherein the rigid link is L-shaped with a first limb carrying the corresponding connector and a second limb having a free end pivotally attached to the child seat structure.

6. A child safety seat according to claim 5, wherein the height of the pivot location above the base surface is at least 30 mm.

7. A child safety seat according to claim 5, wherein the child seat structure comprises a base to which the rigid link is pivotally attached, a seat body pivotally mounted on the base for angular movement about a pivot axis and having a seating surface formed thereon, a first cable guide mounted on the base below said link axis, a second cable guide mounted on the base above said link axis, and a cable having a first end secured to the rigid link below said link axis, said cable extending therefrom round said first cable guide, then round said second cable guide and having a second end secured to said seat body at a location above said pivot axis.

8. A rearward facing child safety seat for use on a vehicle seat having a seat cushion and a seat back, the child safety seat comprising:
   a child seat structure having a base support surface for resting on said seat cushion, and a seating surface for a child occupant, said seating surface including a seat portion and a backrest portion,
   a rigid link projecting from an end of the child seat structure opposite to the backrest portion and attached to the child seat structure solely by a coupling mechanism that permits angular movement of the child seat structure relative to the rigid link about a link axis located above the base support surface, and
   a releasable connector mounted on the rigid link for engagement with a standard anchorage unit associated with the vehicle seat, and
   stop means arranged to restrict the extent of angular movement of the child seat structure relative to the rigid link in a direction such that the bottom of the child seat structure moves towards the releasable connector.

9. A child safety seat according to claim 8, wherein the rigid link is connected to the backrest portion of the child seat structure at a location remote from the seat portion thereof.

10. A rearward facing child safety seat for use in a vehicle comprising:
    a seat structure having a seat portion and a backrest portion for supporting a seat occupant, and a support surface for resting on a vehicle seat cushion,
    a link projecting from an end of the seat portion of the child seat structure opposite to the backrest portion and attached to the child seat structure solely by a coupling joint located above the support surface so as to permit angular movement of the child seat structure relative to the link when the safety seat is in use, and
    a releasable connector mounted on the link for engagement with a standard anchorage associated with the vehicle seat.

11. A child safety seat according to claim 10, further comprising stop means arranged to restrict the extent of angular movement of the child seat structure relative to the link in a direction such that the bottom of the child seat structure moves towards the releasable connector.

12. A child safety seat according to claim 10, wherein a first end of the link is attached to the child seat structure by the coupling joint and a second opposed end of the link engages with the standard anchorage unit associated with the vehicle seat.

* * * * *